United States Patent
Hong et al.

(10) Patent No.: US 10,222,463 B2
(45) Date of Patent: Mar. 5, 2019

(54) SYSTEMS AND METHODS FOR 4-DIMENSIONAL RADAR TRACKING

(71) Applicant: Oculii Corp, Beavercreek, OH (US)

(72) Inventors: Lang Hong, Beavercreek, OH (US); Steven Hong, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 0 days.

(21) Appl. No.: 15/900,682

(22) Filed: Feb. 20, 2018

(65) Prior Publication Data

US 2018/0188365 A1 Jul. 5, 2018

Related U.S. Application Data (63) Continuation of application No. 15/715,480, filed on Sep. 26, 2017, now Pat. No. 9,939,522, which is a
(Continued)

(51) Int. Cl.
| | |
|---|---|
| *G01S 13/58* | (2006.01) |
| *G01S 13/87* | (2006.01) |
| *G01S 13/48* | (2006.01) |
| *G01S 13/44* | (2006.01) |
| *G01S 13/42* | (2006.01) |
| *G01S 13/72* | (2006.01) |

(Continued)

(52) U.S. Cl.
CPC .............. *G01S 13/584* (2013.01); *G01S 3/48* (2013.01); *G01S 13/42* (2013.01); *G01S 13/4454* (2013.01); *G01S 13/87* (2013.01); *G01S 13/726* (2013.01); *G01S 13/91* (2013.01)

(58) Field of Classification Search
CPC .... G01S 13/584; G01S 13/42; G01S 13/4454; G01S 13/87; G01S 13/5246; G01S 3/10; G01S 3/28; G01S 3/48; G01S 13/726; G01S 13/66; G01S 13/4472; G01K 9/6232; F41G 5/08; G06G 3/00
See application file for complete search history.

(56) References Cited

U.S. PATENT DOCUMENTS 2,660,371 A * 11/1953 Campbell ................. F41G 5/08
                                                             235/404
2,696,947 A * 12/1954 Hauser ....................... G06G 3/00
                                                             235/404

(Continued)

FOREIGN PATENT DOCUMENTS

| EP | 2144084 | 1/2010 |
|---|---|---|
| EP | 2602637 | 6/2013 |
| WO | 03099 | 5/1987 |

*Primary Examiner* — Bernarr E Gregory
(74) *Attorney, Agent, or Firm* — Jeffrey Schox; Tom Gwinn (57) ABSTRACT

A method for four-dimensional radar tracking includes transmitting a first probe signal; receiving a first reflected probe signal at first and second radar arrays of the radar system; detecting a tracking target; calculating a target range; calculating a target range rate; performing ambiguous angle calculations for first and second target angles; performing unambiguous angle calculations for the first and second target angles; and calculating a four-dimensional tracking solution, including position and range-rate, from the target range, target range-rate, ambiguous angle calculations, and unambiguous angle calculations.

19 Claims, 5 Drawing Sheets

Related U.S. Application Data continuation-in-part of application No. 14/227,967, filed on Mar. 27, 2014, now abandoned.

(60) Provisional application No. 61/890,267, filed on Oct. 13, 2013.

(51) Int. Cl.
*G01S 13/91* (2006.01)
*G01S 3/48* (2006.01)
*G01S 13/00* (2006.01)

(56) References Cited

U.S. PATENT DOCUMENTS

| | | | |
|---|---|---|---|
| 3,490,018 A | | 1/1970 | Botwin et al. |
| 3,935,572 A | * | 1/1976 | Broniwitz ............ G01S 13/4472 342/80 |
| 4,170,774 A | | 10/1979 | Schaefer |
| 4,184,154 A | | 1/1980 | Albanese et al. |
| 4,321,601 A | | 3/1982 | Richman |
| 4,751,511 A | * | 6/1988 | Komata ................ G01S 13/87 342/424 |
| 4,796,031 A | * | 1/1989 | Koki .................... G01S 13/42 342/148 |
| 4,823,272 A | * | 4/1989 | Inselberg ............. G01S 13/91 701/120 |
| 4,853,699 A | | 8/1989 | Easton |
| 5,537,119 A | * | 7/1996 | Poore, Jr. ............. G01S 13/726 342/90 |
| 5,740,047 A | | 4/1998 | Pilley et al. |
| 5,867,804 A | | 2/1999 | Pilley et al. |
| 5,936,549 A | | 8/1999 | Tsuchiya |
| 6,061,022 A | * | 5/2000 | Menegozzi ............ G01S 3/28 342/140 |
| 6,140,963 A | * | 10/2000 | Azzarelli ............. G01S 3/10 342/362 |
| 6,225,942 B1 | | 5/2001 | Alon |
| 6,400,313 B1 | | 6/2002 | Morici et al. |
| 6,545,633 B1 | | 4/2003 | Jensen |
| 6,704,692 B1 | * | 3/2004 | Banerjee ............. G01S 13/726 342/96 |
| 6,856,279 B2 | | 2/2005 | Hager et al. |
| 7,266,477 B2 | | 9/2007 | Foessel |
| 7,664,596 B2 | | 2/2010 | Wise et al. |
| 7,675,458 B2 | * | 3/2010 | Hubbard ............ G01S 13/5246 342/159 |
| 7,688,253 B2 | | 3/2010 | Burlet |
| 576,057 A1 | | 2/2011 | Hebert et al. |
| 7,889,116 B2 | | 2/2011 | Harada et al. |
| 8,380,367 B2 | | 2/2013 | Schultz et al. |
| 8,482,455 B2 | | 7/2013 | Kemkemian et al. |
| 8,818,696 B2 | | 8/2014 | Klooster et al. |
| 9,014,880 B2 | | 4/2015 | Durling et al. |
| 9,470,782 B2 | | 10/2016 | Millar et al. |
| 9,939,522 B2 | * | 4/2018 | Hong et al. ......... G01S 13/584 |
| 2003/0210177 A1 | * | 11/2003 | Hager et al. ......... G01S 13/42 |
| 2005/0231420 A1 | * | 10/2005 | Brookner ............. G01S 13/87 342/59 |
| 2006/0227135 A1 | * | 10/2006 | Johnson ............. G06K 9/6232 345/423 |
| 2010/0013697 A1 | * | 1/2010 | De Waard ........... G01S 13/66 342/59 |

\* cited by examiner

SYSTEMS AND METHODS FOR 4-DIMENSIONAL RADAR TRACKING

CROSS-REFERENCE TO RELATED APPLICATIONS

This application is a continuation of U.S. patent application Ser. No. 15/715,480, filed Sep. 26, 2017, now U.S. Pat. No. 9,939,522, which is a continuation in part of U.S. patent application Ser. No. 14/227,967, filed on Mar. 27, 2014, now abandoned, which claims the benefit of U.S. Provisional Application Ser. No. 61/890,267, filed on Oct. 13, 2013, all of which are incorporated in theft entireties by this reference.

TECHNICAL FIELD

This invention relates generally to the radar field, and more specifically to new and useful systems and methods for 4-dimensional radar tracking.

BACKGROUND

Traditional array-based RADAR receivers calculate azimuth and/or elevation by measuring the time or phase difference between received probe signals at different receivers (or antennas) within the array(s) using beamforming (e.g., digital beamforming). Similar effects may be produced using a transmit array instead of a receiver array. These traditional solutions are limited: angular resolution depends both on the number of elements in the array and the angle between the array and the target:

$$\theta_{resolution} \approx \frac{\lambda}{Nd\cos\theta}$$

where N is the number of elements in the array and d is the distance separating them.

Thus, there is a need in the radar field to create new and useful systems and methods for 4-dimensional radar tracking. This invention provides such new and useful systems and methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. System for 4-Dimensional Radar Tracking

Figure 1:
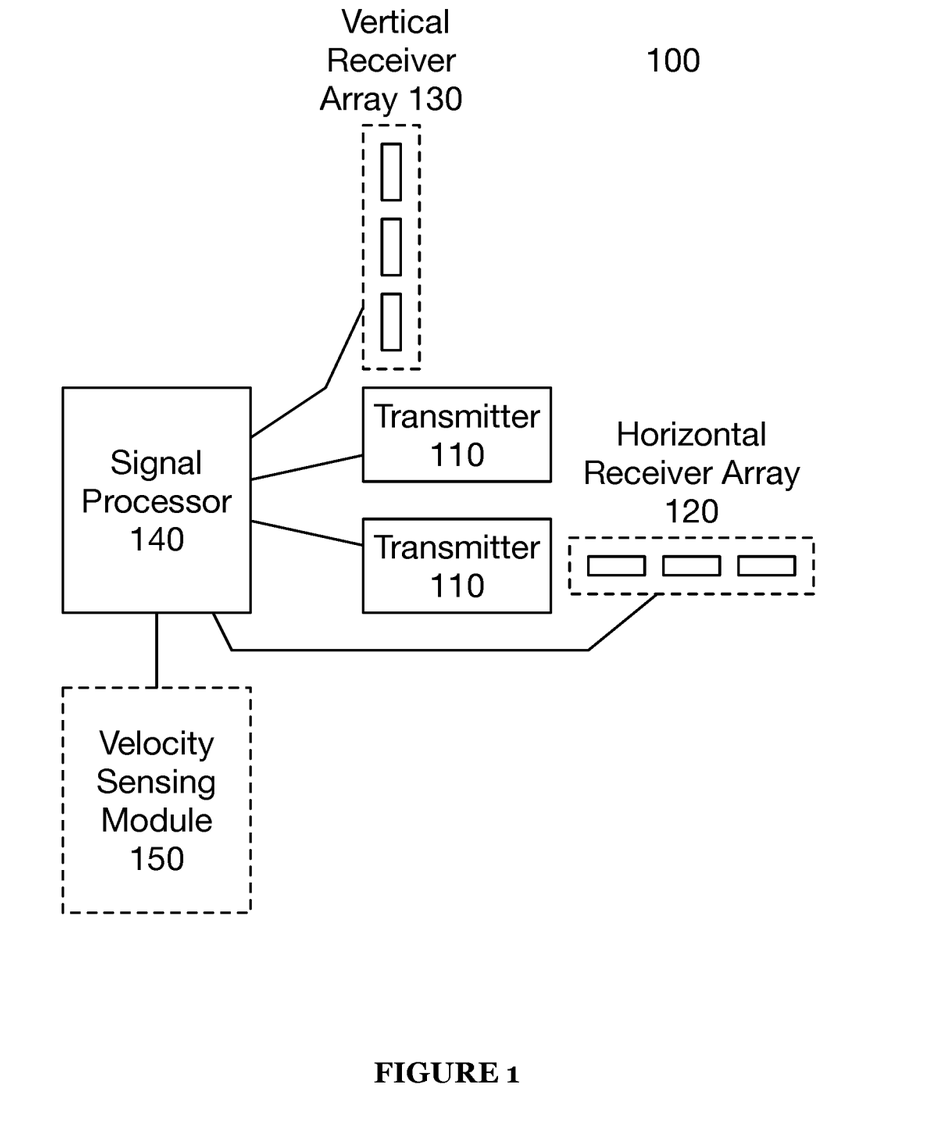
FIG. 1 is a diagram view of a system of an invention embodiment.

A system 100 for Doppler-enhanced radar tracking includes a transmitter 110, a horizontal receiver array 120, a vertical receiver array 130, and a signal processor 140, as shown in FIG. 1. The system 100 may additionally include a velocity sensing module 150.

As discussed in the background section, traditional array-based radar systems are limited: maximum angular resolution depends both on the number of elements in the array and the angle between the array and the target:

$$\theta_{res} \approx \frac{\lambda}{Nd\cos\theta}$$

where N is the number of elements in the array and d is the distance separating them.

For many applications like autonomous vehicle sensing, resolution may be limited by small array separation lengths and low array element numbers. For example, an array having three elements with d=0.25 m has a maximum angular resolution of 0.30 degrees at 0 degrees (0.42 at 45 degrees).

In contrast, systems utilizing traditional phase comparison monopulse techniques suffer no inherent angular resolution constraints; such systems are limited only by the phase detection resolution of the system:

$$\theta_{res} \approx \arcsin\frac{\lambda\Delta\phi_{res}}{2\pi d}$$

Despite this advantage, traditional phase comparison monopulse techniques are often unsuitable for applications like autonomous vehicle sensing. This is for two reasons: the first is that phase comparison monopulse systems must either rely on encountering only a single target at a time (e.g., by scanning a narrow beam in a low-target-density environment) or must detect targets using another technique first (e.g., via time of arrival range estimates) before calculating angle. The second is that while phase comparison monopulse systems increase in accuracy/resolution as element separation increases, for element separations above $$\frac{\lambda}{2},$$

the output of the phase comparison monopulse calculation "wraps" with angle. For example, $d=4\lambda$ and $\Delta\phi=\pi+2\pi k$ (where k is an integer). Valid angles are produced for multiple k values:

$$\theta = \arcsin\frac{\lambda\Delta\phi}{2\pi d}$$

$\{-4, -3, -2, -1, 0, 1, 2, 3\} \to$ $\{-61.0°, -38.7°, -22.0°, -7.2°, 7.2°, 22.0°, 38.7°, 61.0°\}$

Thus, the initial output of 7.2 is referred to as an "ambiguous" angle, since 2Pi phase shifts in phase may produce other valid angles. Accordingly, phase comparison monopulse systems must operate in narrow angle ranges to avoid generating ambiguous angles (typically operating using beam scanning with known angles, also a solution to the first issue).

The system 100 utilizes a novel and unique approach inspired by both of phase monopulse comparison and traditional beamforming techniques; this approach may generate target angles with the heightened resolution typical of traditional phase monopulse comparison without sacrificing the convenience and wide angle-of-operation of beamforming array radars. As discussed in further sections, this is enabled by sophisticated four-dimensional target identification and the use of beamforming to refine monopulse comparison. The system 100 may achieve further accuracy from the use of polarization enhancement, also discussed below.

The transmitter 110 functions to transmit a signal that, after reflection by a target, can provide information about the target (e.g., relative location, velocity, etc.). The transmitter 110 preferably transmits a frequency shift keyed (FSK) RADAR signal or a frequency-modified continuous wave (FMCW) RADAR signal, but the transmitter 110 may transmit any signal satisfying these constraints; e.g., an electromagnetic signal (as in radio waves in RADAR, infrared/visible/UV waves in LIDAR), a sound signal (as in SONAR). Note that signals transmitted by a transmitter 110 may have any properties (e.g., waveform, amplitude, phase, signal type, polarization, etc.) and that these properties may be dynamically adjusted at any time. In particular, signals transmitted may be adjusted in polarization and/or magnitude to increase selectivity to particular targets (e.g., some targets may be more likely to return horizontally polarized signals with less polarization change than vertically polarized signals—so horizontally polarized signals may be more selective for these targets).

Signals transmitted by transmitters 110 may be polarized in any manner (linearly, circularly, elliptically, etc.) and using any technique.

Within some window of time, transmitters 110 may transmit a single probe signal or multiple probe signals. For example, a vertically polarized transmitter 110 may transmit a first probe signal while a horizontally polarized transmitter 110 may transmit a second probe signal. These signals are preferably transmitted synchronously and coherently, but may additionally or alternatively have any relationship (e.g., may be transmitted asynchronously and/or signals may not be coherent). If multiple probe signals are transmitted they may be of the same type or of different types. For example, one probe signal may be an FSK signal (which achieves high resolution for Doppler measurements) while another may be an FMCW signal (which achieves high range resolution).

If utilizing polarization-enhancement, the system 100 preferably includes one transmitter 110 for each receiver array 120/130; each transmitter being polarized differently. For example, in a system 100 including one horizontal receiver array 120 and one vertical receiver array 130, the system 100 may include two transmitters 110 (one polarized to a first polarization L1, the other polarized to a second polarization L2). Alternatively, the system 100 may include any number (including one) of transmitters 110.

The transmitter 110 preferably has a single transmitting element (e.g., a single transmit antenna), but may additionally or alternatively have multiple transmitting elements (e.g., as in a radar array). If the transmitter 110 has multiple elements, these elements may include a single transmitter paired to multiple antennas (e.g., spaced in a particular pattern and/or with antennas coupled to phase/time delays); multiple transmitters, each paired to a single antenna; multiple transmitters paired to multiple antennas, or any other configuration.

The horizontal receiver array 120 functions to receive data resulting from the reflection of the probe signal(s) transmitted by the transmitter 110. The horizontal receiver array 120 preferably measures phase, magnitude, and frequency information from reflected probe signals, but the horizontal receiver array 120 may additionally or alternatively measure any available characteristics of the reflected probe signals.

Figure 2:
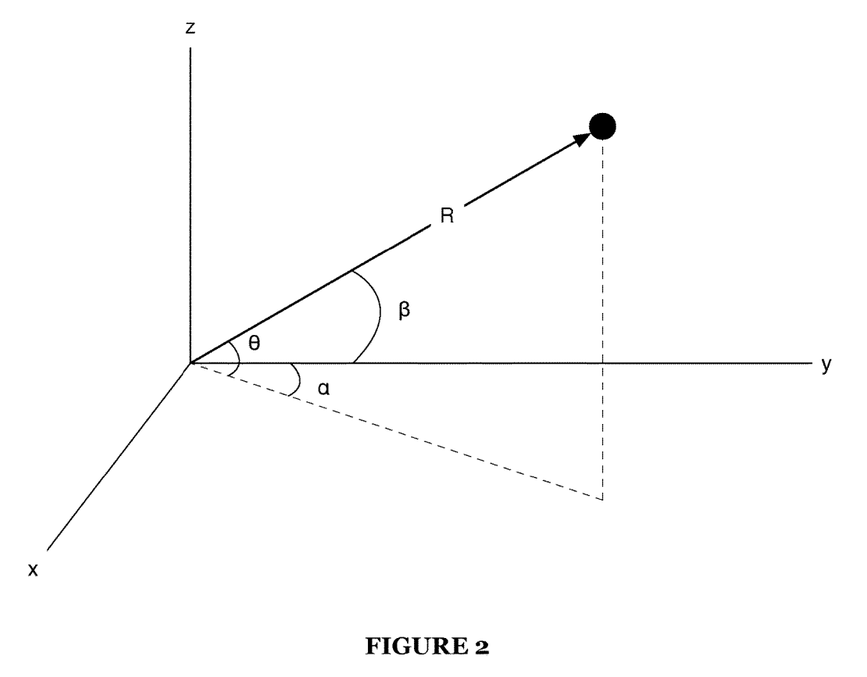
FIG. 2 is an example view of a tracking target in a spherical coordinate system.

From data received from the horizontal receiver array 120, tracking parameters relating to a tracking target may be calculated. The horizontal receiver array 120 is preferably used to determine azimuth ($\alpha$), as shown in FIG. 2, but parameters used to establish target position may be defined in any coordinate system and base, and the horizontal receiver array 120 may be used to determine any relevant tracking parameters. In the present application, target position is preferably represented in a Cartesian coordinate system with the origin at the radar (e.g., x,y,z represents target position) or a spherical coordinate system with the same origin, wherein position is defined by range (R), azimuth ($\alpha$), and elevation ($\theta$); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The system 100 may calculate any such angles.

The horizontal receiver array 120 includes a set of receiver elements arranged in a pattern; e.g., along a horizontal axis. The set of receiver elements may include a single receiver paired to multiple antennas (e.g., spaced in a particular pattern and/or with antennas coupled to phase/time delays); multiple receivers, each paired to a single antenna; multiple receivers paired to multiple antennas, or any other configuration.

The horizontal receiver array 120 preferably is used to calculate angles from phase information but may additionally or alternatively be used to calculate angles in any manner.

The vertical receiver array 130 is preferably substantially similar to the horizontal receiver array 120, except that the vertical receiver array is arranged upon an axis not parallel to the axis of the horizontal receiver array (e.g., a vertical axis). The vertical receiver array 130 is preferably used to calculate elevation, but may additionally or alternatively be used to calculate any tracking parameters.

Figure 4:
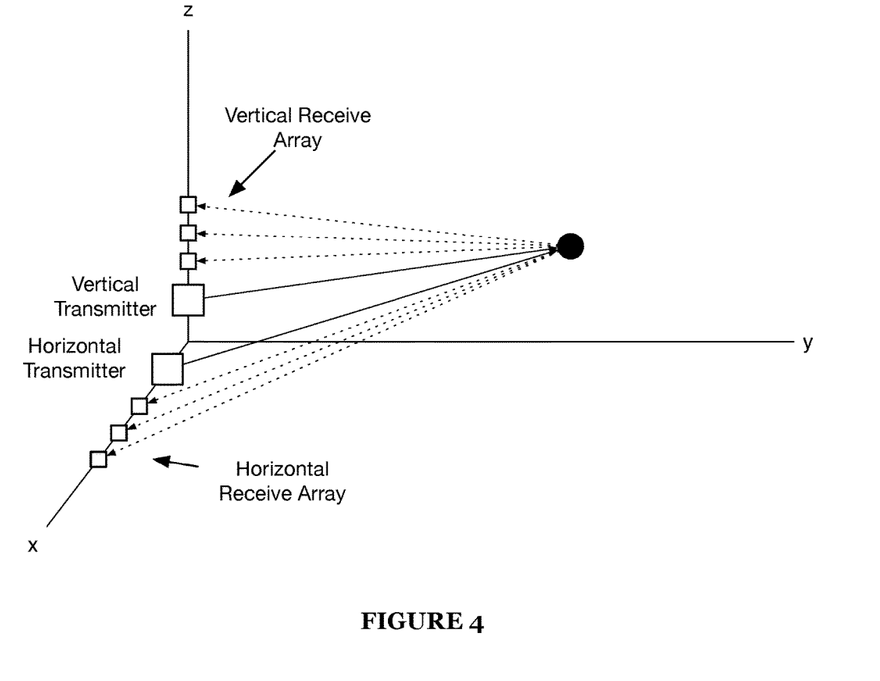
FIG. 4 is a three-dimensional diagram view of an array-based radar system.

An example orientation of transmitters 110 and receiver arrays 120/130 is as shown in FIG. 4.

Both of the horizontal receiver array 120 and vertical receiver array 130 are preferably polarized (e.g., have polarizing filters or otherwise process or receive signals in a polarization-dependent manner). For example, the horizontal receiver array 120 may have a linear polarizing filter with a first orientation, while the vertical receiver array 130 may have a linear polarizing filter with a second orientation perpendicular to the first. Alternatively, the horizontal receiver array 120 and vertical receiver array 130 may not be polarized or process signals in a polarization-dependent manner.

The signal processor 140 functions to calculate tracking parameters from data collected by the horizontal receiver array 120, the vertical receiver array 130, and/or the velocity sensing module 150. The signal processor 140 preferably includes a microprocessor or microcontroller that calculates tracking parameters according to the method 200; additionally or alternatively, the signal processor 140 may calculate tracking parameters in any manner. The signal processor 140 may additionally or alternatively be used to communicate with an external computer (e.g., to offload computations, receive additional data, or for any other reason). The signal processor 140 may also control configuration of the components of the system 100 or any calculations or actions performed by the system 100.

The velocity sensing module 150 functions to determine the velocity of the system 100 (or components of the system 100, or an object coupled to the system 100). The velocity sensing module is preferably a communications interface that couples to an inertial measurement unit (IMU), but may additionally or alternatively be any communications interface (e.g., Wi-Fi, Ethernet, ODB-II) or sensor (accelerometer, wheel speed sensor, IMU) capable of determining a speed and/or velocity.

2. Method for 4-Dimensional Radar Tracking

Figure 3:
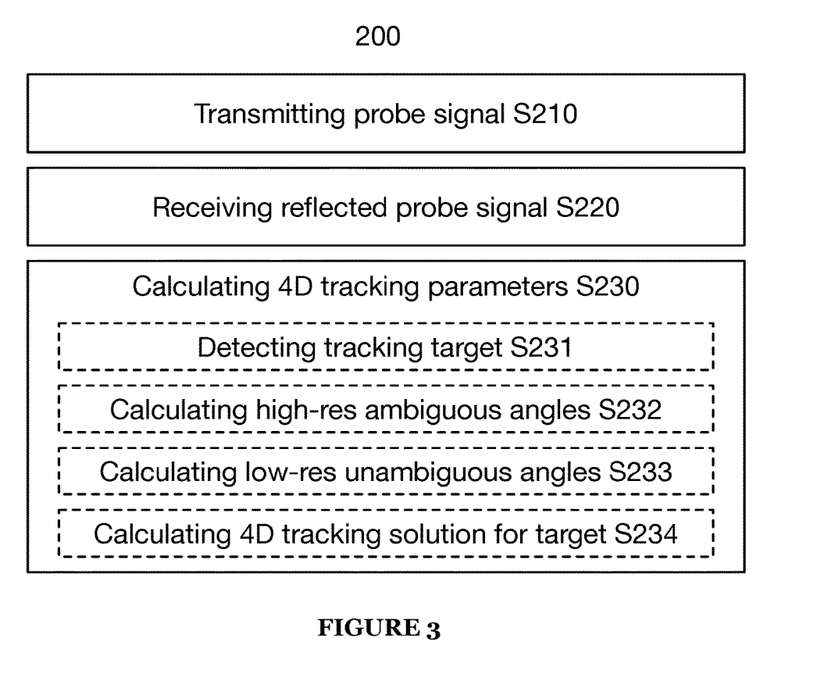
FIG. 3 is a diagram view of a method of an invention embodiment.

A method 200 for 4-dimensional radar tracking includes transmitting a probe signal S210, receiving a reflected probe signal S220, and calculating four-dimensional tracking parameters from the reflected probe signal S230, as shown in FIG. 3.

As discussed in the background section, traditional array-based radar systems are limited: maximum angular resolution depends both on the number of elements in the array and the angle between the array and the target:

$$\theta_{res} \approx \frac{\lambda}{Nd\cos\theta}$$

where N is the number of elements in the array and d is the distance separating them.

For many applications like autonomous vehicle sensing, resolution may be limited by small array separation lengths and low array element numbers. For example, an array having three elements with d=0.25 m has a maximum angular resolution of 0.30 degrees at 0 degrees (0.42 at 45 degrees).

In contrast, systems utilizing traditional phase comparison monopulse techniques suffer no inherent angular resolution constraints; such systems are limited only by the phase detection resolution of the system:

$$\theta_{res} = \arcsin\frac{\lambda\Delta\phi_{res}}{2\pi d}$$

Despite this advantage, traditional phase comparison monopulse techniques are often unsuitable for applications like autonomous vehicle sensing. This is for two reasons: the first is that phase comparison monopulse systems must either rely on encountering only a single target at a time (e.g., by scanning a narrow beam in a low-target-density environment) or must detect targets using another technique first (e.g., via time of arrival range estimates) before calculating angle. The second is that while phase comparison monopulse systems increase in accuracy/resolution as element separation increases, for element separations above $$\frac{\lambda}{2},$$

the output of the phase comparison monopulse calculation "wraps" with angle. For example, d=4λ and Δϕ=π+2πk (where k is an integer). Valid angles are produced for multiple k values:

$$\theta = \arcsin\frac{\lambda\Delta\phi}{2\pi d}$$

$$\{-4, -3, -2, -1, 0, 1, 2, 3\} \rightarrow$$

$$\{-61.0°, -38.7°, -22.0°, -7.2°, 7.2°, 22.0°, 38.7°, 61.0°\}$$

Thus, the initial output of 7.2 is referred to as an "ambiguous" angle, since 2Pi phase shifts in phase may produce other valid angles. Accordingly, phase comparison monopulse systems must operate in narrow angle ranges to avoid generating ambiguous angles (typically operating using beam scanning with known angles, also a solution to the first issue).

The method 200 is a novel and unique approach inspired by both of phase monopulse comparison and traditional beamforming techniques; this approach may generate target angles with the heightened resolution typical of traditional phase monopulse comparison without sacrificing the convenience and wide angle-of-operation of beamforming array radars. As discussed in further sections, this is enabled by sophisticated four-dimensional target identification and the use of beamforming to refine monopulse comparison. The method 200 may achieve further accuracy from the use of polarization enhancement, also discussed below.

The method 200 is preferably implemented by a system for 4-dimensional radar tracking (e.g., the system 100), but may additionally or alternatively be implemented using any suitable object tracking system capable of receiving 4-dimensional tracking information (e.g., SONAR, LIDAR).

S210 includes transmitting a probe signal. S210 functions to transmit a signal that, after reflection by a target, can provide information about the target (e.g., relative location, velocity, etc.). S210 preferably includes transmitting a frequency shift keyed (FSK) RADAR signal or a frequency-modified continuous wave (FMCW) RADAR signal, but S210 may include transmitting any signal satisfying these constraints; e.g., an electromagnetic signal (as in radio waves in RADAR, infrared/visible/UV waves in LIDAR), a sound signal (as in SONAR). Note that signals transmitted in S210 may have any properties (e.g., waveform, amplitude, phase, signal type, polarization, etc.) and that these properties may be dynamically adjusted at any time. In particular, signals transmitted in S210 may be adjusted in polarization and/or magnitude to increase selectivity to particular targets (e.g., some targets may be more likely to return horizontally polarized signals with less polarization change than vertically polarized signals—so horizontally polarized signals may be more selective for these targets).

Within some window of time, S210 may include transmitting a single probe signal or multiple probe signals. For example, S210 may include transmitting a first probe signal from a vertically polarized transmitter and a second probe signal from a horizontally polarized transmitter. These signals are preferably transmitted synchronously and coherently, but may additionally or alternatively have any relationship (e.g., may be transmitted asynchronously and/or signals may not be coherent). If multiple probe signals are transmitted they may be of the same type or of different types. For example, one probe signal may be an FSK signal (which achieves high resolution for Doppler measurements) while another may be an FMCW signal (which achieves high range resolution).

S220 includes receiving a reflected probe signal. S220 functions to receive data resulting from the reflection of the probe signal(s) transmitted in S210. S220 preferably includes measuring phase, magnitude, and frequency information from reflected probe signals, but S220 may additionally or alternatively include measuring any available characteristics of the reflected probe signals.

S220 preferably includes receiving one or more reflected probe signals at element arrays (as described in the system 100) but may additionally or alternatively include receiving signals in any manner.

S230 includes calculating four-dimensional tracking parameters from the reflected probe signal. S230 functions to identify a tracking target and calculate a four-dimensional tracking solution for that target that includes a three-dimensional target position as well as some estimate of target speed (e.g., target range rate).

Note that in the case of multiple probe signals being transmitted, S230 may calculate tracking parameters from any combination of these probe signals.

S230 may additionally or alternatively include performing any signal processing to aid in the calculation of four-dimensional tracking parameters. For example, S230 may include conditioning signals to remove noise (e.g., by filtering signals based on frequency, polarization, phase, etc.). As a second example, S230 may adjust phase or other signal characteristics received by tracking system antennas to account for antenna coupling.

S230 preferably includes detecting a tracking target S231, performing high-resolution ambiguous angle calculations S232, performing low-resolution unambiguous angle calculations S233, and calculating a four-dimensional tracking solution for the tracking target S234, as shown in FIG. 3. The steps of S230 may be performed at any time in any order. Alternatively, S230 may include calculating four-dimensional tracking parameters from the reflected probe signal in any manner.

S231 includes detecting a tracking target. S231 functions to identify signal components of the reflected probe signal received in S220 corresponding to an object for which tracking is desired (as opposed to components of the reflected probe signal corresponding to noise, clutter, interference, or other objects).

Traditionally, RADAR target detection utilizes range-based or range- and range-rate-based constant false alarm rate (CFAR) techniques. CFAR and related techniques operate by bucketing reflected probe signal data into cells, and detecting a cell as containing a tracking target if signal power in that cell exceeds a dynamically set threshold level. The threshold level in CFAR is dynamically set to (ideally) maintain a constant false alarm rate (hence the name). Threshold setting may be determined in many ways (e.g., by averaging power levels of neighboring cells, referred to as cell-averaging CFAR or CA-CFAR; or by taking more rigorous account of the statistics of background noise across cells, referred to as ordered-statistics CFAR or OS-CFAR).

While the mathematics of CFAR are applicable to any type of data that could be used to perform target detection, as previously mentioned, CFAR is traditionally applied to one or both of range or range-rate. The number of data sources used to perform CFAR may be referred to as dimensionality; thus, traditional CFAR is either 1D CFAR (operating on range OR range-rate) or 2D CFAR (operating on range AND range-rate).

S231 may include detecting tracking targets using any technique; however, in one implementation of an invention embodiment, S231 includes detecting tracking targets using a unique four-dimensional (4D) CFAR technique. In this technique, which relies on the presence of differently-polarized receivers (e.g., a horizontally polarized receiver array and a vertically polarized receiver array), CFAR is performed jointly on range and range rate found independently for each polarization (e.g., $$R_H, \left(\frac{dR}{dT}\right)_H, R_V, \left(\frac{dR}{dT}\right)_V).$$

Because noise, clutter, and interference may vary substantially with polarization, performing CFAR on these four data sources jointly may provide substantially more accurate and/or faster target detection than in two dimensions alone. Note that the polarization difference between receiver arrays is critical for this particular implementation; while it is possible that sourcing CFAR data from multiple receiver arrays that are not differently-polarized may improve accuracy, it would not be capable of doing so to the same extent as in the technique described (though in alternative implementations, the method 200 may include sourcing CFAR data from multiple identically-polarized receiver arrays).

S231 may include weighting data in any manner. For example, if a particular type of target is more easily detected in a first polarization than a second, data resulting from that polarization may be weighted more heavily in target detection.

Note that while S231 is preferably performed using range and range-rate data, S231 may additionally or alternatively be performed using any suitable data, including range and range-rate intermediates. For example, target range is typically calculated based on time-of-arrival (ToA) techniques, so signal magnitude vs. time may be used as a range intermediate (e.g., target detection may be performed by time bucketing rather than by range bucketing, but bucketing by time is useful because it correlates to range). Likewise, frequency data may be used as a range-rate intermediate (since Doppler shift frequency data may be used to determine range-rate).

Note also that data from receivers of receiver arrays may be utilized in any manner to produce range/range-rate data. For example, data from all of an array of N receivers may be used to form a set of range data (e.g., via averaging), or data taken from a single element of the array (or a subset of elements) may be used to form a set of range data. Following this, S231 may additionally or alternatively include performing target detection with more than four dimensions (e.g., $$R_{H1}, \left(\frac{dR}{dT}\right)_{H1}, R_{V1}, \left(\frac{dR}{dT}\right)_{V1}, R_{H2}, \left(\frac{dR}{dT}\right)_{H2}, R_{V2}, \left(\frac{dR}{dT}\right)_{V2}$$

for two sources of range/range-rate data from each array, for a total of eight dimensions).

S231 may apply CFAR (or another technique) to an entire dataset simultaneously, but may additionally or alternatively perform multiple CFAR steps on data subsets. For example, S231 may include performing CFAR separately on horizontally and vertically polarized data first before performing CFAR jointly to verify target detection.

While S231 preferably includes performing target detection using polarized range/range-rate data, S231 may additionally or alternatively include performing target detection using any suitable information (e.g., preliminary estimates of azimuth/elevation angles obtained from beamforming techniques). While this data is preferably obtained from an object tracking system (e.g., RADAR), some data may additionally or alternatively be obtained from other sources (e.g., a GPS receiver or IMU physically coupled to the position of the object tracking receiver, external tracking systems, etc.).

S231 may additionally or alternatively perform any signal processing that aids in target detection. For instance, S231 may average, delay, phase shift, amplify, and/or attenuate signal data from receiver elements.

Figure 5:
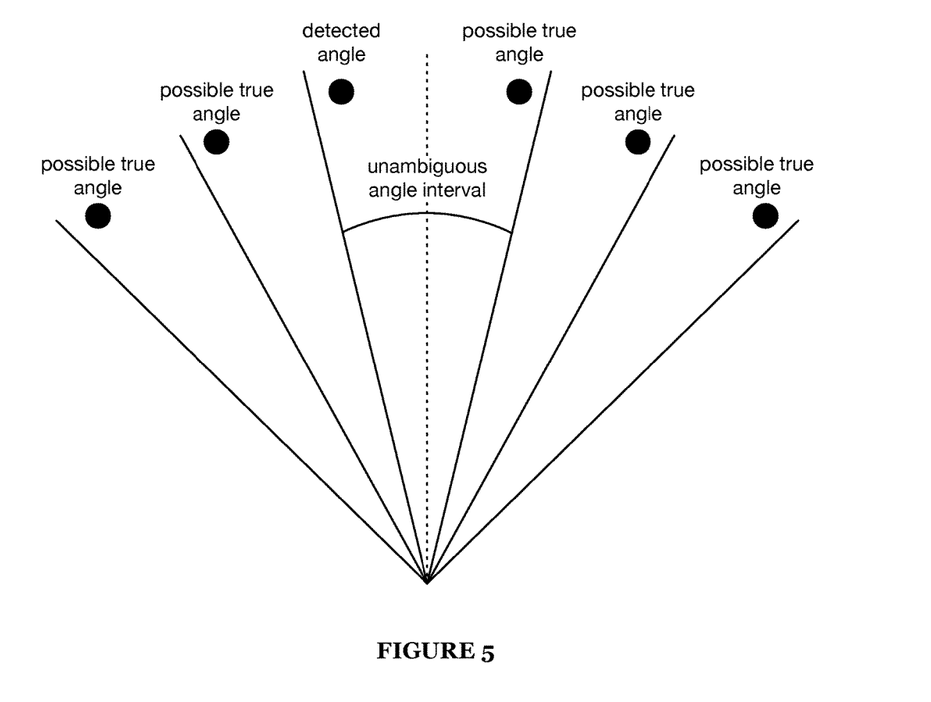
FIG. 5 is a diagram view of angle unwrapping.

S232 includes performing high-resolution ambiguous angle calculations. S232 functions to calculate initial angle calculations for one or more targets identified in S231 using a technique that results in high-resolution but ambiguous results (where ambiguous here specifically refers to an angle calculation that produces a set of angles as a result, rather than a single angle; for example, as shown in FIG. 5). S232 preferably includes performing angle calculations using a phase-comparison monopulse technique, but may additionally or alternatively include performing angle calculations in any manner.

The accuracy of phase-comparison monopulse techniques is positively correlated to the distance between receiver elements for which phase data is compared; however, the maximum unambiguous angle range (i.e., the largest angle that can be calculated without angle wrapping) is negatively correlated to this distance. S232 preferably includes performing phase-comparison monopulse techniques for a given RADAR element array using the first and last (i.e., farthest spaced) elements of the array, which maximizes accuracy but also results in the smallest unambiguous angle range. S232 may additionally or alternatively include using any suitable elements of an object tracking system to perform phase-comparison monopulse techniques. In some embodiments, S232 may include dynamically selecting the receiver elements used to perform phase-comparison monopulse techniques (e.g., based on receiver noise or any other relevant factor).

S232 preferably includes calculating both elevation and azimuth angles for a given target, but S232 may additionally or alternatively include calculating any target angles (e.g., any angle(s) in planes perpendicular to receiver arrays) and/or any intermediate calculations (e.g., S232 may include calculating phase differences between receivers in an array, which may be used in S233 and/or S234 as intermediates to target angle calculations).

S232 may store and/or communicate angle ambiguity in any manner. For example, S232 may produce a set of possible angles instead of a single angle output; alternatively, S232 may produce a single ambiguous angle with some ambiguity parameter (e.g., maximum unambiguous angle).

S233 includes performing low-resolution unambiguous angle calculations. S233 functions to calculate initial angle calculations for one or more targets identified in S231 using a technique that results in low-resolution but unambiguous results. S233 preferably includes performing angle calculations using a digital beamforming technique, but may additionally or alternatively include performing angle calculations in any manner.

Beamforming techniques that may be used by S233 include but are not limited to conventional (i.e., Bartlett) beamforming, Minimum Variance Distortionless Response (MVDR, also referred to as Capon) beamforming, Multiple Signal Classification (MUSIC) beamforming, or any other beamforming technique.

S233 preferably includes performing digital beamforming for a given object-tracking element array using every element in the array, but S233 may additionally or alternatively use any subset of elements to perform low-resolution unambiguous angle calculations. In some embodiments, S233 may include dynamically selecting the receiver elements used to perform digital beamforming techniques (e.g., based on receiver noise or any other relevant factor).

Note that S233 may be performed at any time (including, in some cases, before object detection in S231). For example, S233 may be performed before, concurrent with, or after S232.

If S233 is performed concurrently or after S232, S233 may include performing localized beamforming calculations around possible unambiguous angles (e.g., the set of angles generated in S232) instead of performing a general beamforming calculation. For example, Capon beamforming seeks to maximize:

$$\hat{P}_{Capon}(\theta) = \frac{1}{v^H R^{-1} v}$$

Typically, the maximum value is found by calculating this across an entire angle range. In contrast, S233 may include calculating beamforming power at only specific points or ranges identified in S232. For example, S233 may include calculating the beamforming power only at the angles calculated in S232 and choosing the angle with the maximum power of that set as the appropriate unambiguous angle. This may substantially reduce the computational resources required to perform beamforming.

S234 includes calculating a four-dimensional tracking solution for the tracking target. S234 functions to calculate a set of tracking parameters that identify at least a position and range-rate of the target relative to the radar receiver; additionally or alternatively, tracking parameters may include additional parameters relevant to object tracking (e.g., target velocity, target acceleration). Note that S234 may include calculating more tracking parameters for a given target than necessary to achieve a position solution.

Further, while S234 primarily includes calculating tracking parameters from the reflected probe signal, S234 may additionally or alternatively calculate or otherwise receive parameters relevant to object tracking (e.g., radar egomotion velocity) that are not calculated using the probe signal.

Parameters used to establish target position may be defined in any coordinate system and base. In the present application, target position is preferably represented in a Cartesian coordinate system with the origin at the radar (e.g., x,y,z represents target position) or a spherical coordinate system with the same origin, wherein position is defined by range (R), azimuth ($\alpha$), and elevation ($\theta$); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The method 200 may include calculating any such angles.

While, as previously mentioned, any parameters relevant to object tracking may be calculated in S234, some additional parameters that may be calculated include target range rate $$\left(\frac{dR}{dt},\right.$$

typically calculated from Doppler data), relative target velocity (the velocity of the target with respect to the radar receiver), radar egomotion velocity (referred to in this application as egovelocity, the velocity of the radar receiver relative to a stationary position). These may be related; for example, range rate is equivalent to relative target velocity multiplied by the cosine of the looking angle between the radar and the target.

S234 may additionally or alternatively include calculating composite angle (β, the angle between the target and the radar: β=arccos [cos α×cos θ], see also FIG. 2).

S234 may include calculating tracking parameters from any suitable data source. For example, operating on a radar system with a horizontal receiver array, azimuth may be calculated based on phase differences between the reflected probe signal seen by each receiver in the array. Likewise, elevation may be calculated in a similar manner by a vertical receiver array (and/or elevation and azimuth may be calculated in similar manners by a two-dimensional receiver array). Range, for example, may be calculated based on travel time of a probe signal. Range rate, for example, may be calculated instantaneously (e.g., using Doppler frequency shift data) or over time (e.g., by measuring change in range over time). Composite angle may be derived from elevation/azimuth or calculated in any other manner.

S234 preferably includes calculating object position by unwrapping the ambiguous angle data calculated in S232 using the unambiguous angle data calculated in S233. S234 preferably uses the unambiguous angle data to constrain the ambiguous angle data (e.g., by using unambiguous angle data to select one of a set of possible angles generated in S232; alternatively, by using unambiguous angle data and ambiguous angle data to back out the actual phase difference between receiver elements). This alternative example involves selecting the appropriate integer k for Δϕ=π+2πk. The data resulting from this unwrapping may be used to generate or select angles (e.g., azimuth and elevation) directly, or the data may be used as an intermediate (e.g., for a 3D Cartesian position).

S234 may additionally include calculating relative target velocity in any manner. For example, S234 may include determining that a target is stationary and calculating relative target velocity based on egovelocity (i.e., in this case, relative target velocity is egovelocity). As another example, S234 may include receiving relative target velocity information based on external data; e.g., an estimate from a visual tracking system coupled to the position of the radar receiver. Relative target velocity information may even be provided by an external tracking system or the target itself (e.g., transmissions of IMU data from a target vehicle).

S234 may additionally include refining the tracking parameters. For example, S234 may include running a Kalman filter on Cartesian coordinates of a target generated from elevation angle or azimuth angle (determined from phase information), range, and/or range-rate. S234 may additionally or alternatively include filtering, refining, and/or constraining tracking parameters in any manner.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for polarization-enhanced 4-dimensional radar tracking. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for four-dimensional radar tracking comprises:
    a transmitter that transmits a first probe signal;
    a horizontal receiver array, comprising a first plurality of radar elements positioned along a first radar axis, that receives a first reflected probe signal in response to reflection of the first probe signal by a tracking target; wherein the tracking target and the horizontal receiver array are connected by a target vector;
    a vertical receiver array, comprising a second plurality of radar elements positioned along a second radar axis, the second radar axis not parallel to the first radar axis, that also receives the first reflected probe signal in response to reflection of the first probe signal by the tracking target; and
    a signal processor, coupled to the horizontal and vertical receiver arrays, that calculates a four-dimensional tracking solution by:
        detecting the tracking target;
        calculating a target range;
        calculating a target range rate;
        performing ambiguous angle calculations for first and second target angles; wherein the first target angle is between a first reference vector and a first projected target vector; wherein the first projected target vector is the target vector projected into a first reference plane, the first reference plane containing both of the first radar axis and the first reference vector; wherein the second target angle is between a second reference vector and a second projected target vector; wherein the second projected target vector is the target vector projected into a second reference plane, the second reference plane containing both of the second radar axis and the second reference vector;
        performing unambiguous angle calculations for the first and second target angles; and
        calculating the four-dimensional tracking solution, including position and range-rate, from the target range, target range-rate, ambiguous angle calculations, and unambiguous angle calculations.

2. The system of claim 1, wherein the first target angle is elevation and the second target angle is azimuth.

3. The system of claim 1, wherein the unambiguous angle calculations are lower resolution than the ambiguous angle calculations; wherein the signal processor calculates the four-dimensional tracking solution using the unambiguous angle calculations to constrain the ambiguous angle calculations.

4. The system of claim 3, wherein the signal processor unwraps the ambiguous angle calculations using the unambiguous angle calculations.

5. The system of claim 3, wherein the signal processor calculates a first target range from data received at the horizontal radar array and calculates a second target range from data received at the vertical radar array; wherein the signal processor calculates a first target range rate from data received at the horizontal radar array and calculates a second target range rate from data received at the vertical radar array; wherein the signal processor detects the tracking target from the first and second ranges and first and second range rates.

6. The system of claim 5, wherein the signal processor detects the tracking target using a four-dimensional constant false alarm rate (CFAR) technique operating on the first and second ranges and first and second range rates.

7. The system of claim 6, wherein the four-dimensional constant false alarm rate (CFAR) technique is performed on all of the first and second ranges and first and second range rates simultaneously.

8. The system of claim 6, wherein the four-dimensional constant false alarm rate (CFAR) technique is performed first on the first range and first range rate, and then on the second range and second range rate.

9. The system of claim 3, wherein the signal processor performs ambiguous angle calculations for first and second target angles using a phase-comparison monopulse technique; wherein the signal processor performs unambiguous angle calculations for first and second target angles using a digital beamforming technique.

10. The system of claim 9, wherein the signal processor performs ambiguous angle calculations for the first target angle by comparing phase between farthest-spaced elements of the first plurality of radar elements; wherein the signal processor performs ambiguous angle calculations for the second target angle by comparing phase between farthest-spaced elements of the second plurality of radar elements.

11. The system of claim 10, wherein the signal processor selectively calculates beamforming power at angles identified by performing ambiguous angle calculations; wherein the signal processor unwraps the ambiguous angle calculations using the unambiguous angle calculations by selecting angle data corresponding to maxima of the selective beamforming power calculations.

12. The system of claim 3, wherein the horizontal radar array has a first linear polarization; wherein the vertical radar array has a second linear polarization orthogonal to the first linear polarization.

13. A system for four-dimensional radar tracking comprises:
- a transmitter that transmits first and second probe signals simultaneously;
- a horizontal receiver array, comprising a first plurality of radar elements positioned along a first radar axis, that receives a first reflected probe signal in response to reflection of the first probe signal by a tracking target and a second reflected probe signal in response to reflection of the second probe signal by the tracking target; wherein the tracking target and the horizontal receiver array are connected by a target vector;
- a vertical receiver array, comprising a second plurality of radar elements positioned along a second radar axis, the second radar axis not parallel to the first radar axis, that also receives the first reflected probe signal in response to reflection of the first probe signal by the tracking target and the second reflected probe signal in response to reflection of the second probe signal by the tracking target; and
- a signal processor, coupled to the horizontal and vertical receiver arrays, that calculates a four-dimensional tracking solution by:
  - detecting the tracking target;
  - calculating a target range;
  - calculating a target range rate;
  - performing ambiguous angle calculations for first and second target angles; wherein the first target angle is between a first reference vector and a first projected target vector; wherein the first projected target vector is the target vector projected into a first reference plane, the first reference plane containing both of the first radar axis and the first reference vector; wherein the second target angle is between a second reference vector and a second projected target vector; wherein the second projected target vector is the target vector projected into a second reference plane, the second reference plane containing both of the second radar axis and the second reference vector;
  - performing unambiguous angle calculations for the first and second target angles; and
  - calculating the four-dimensional tracking solution, including position and range-rate, from the target range, target range-rate, ambiguous angle calculations, and unambiguous angle calculations.

14. The system of claim 13, wherein the transmitter transmits the first probe signal with a first polarization and transmits the second probe signal with a second polarization not identical to the first polarization.

15. The system of claim 14, wherein the horizontal radar array is polarized with the first polarization; wherein the vertical radar array is polarized with the second polarization.

16. The system of claim 15, wherein the signal processor calculates the target range by calculating a first-polarized target range from data received at the horizontal radar array and calculating a second-polarized target range from data received at the vertical radar array; wherein the signal processor calculates the target range rate by calculating a first-polarized target range rate from data received at the horizontal radar array and calculating a second-polarized target range rate from data received at the vertical radar array; wherein the signal processor detects the tracking target from the first-polarized and second-polarized ranges and first-polarized and second-polarized range rates.

17. The system of claim 16, wherein the signal processor detects the tracking target from a four-dimensional constant false alarm rate (CFAR) technique operating on the first-polarized and second-polarized ranges and first-polarized and second-polarized range rates.

18. The system of claim 17, wherein the four-dimensional constant false alarm rate (CFAR) technique is performed on all of the first-polarized and second-polarized ranges and first-polarized and second-polarized range rates simultaneously.

19. The system of claim 17, wherein the four-dimensional constant false alarm rate (CFAR) technique is performed first on the first-polarized range and first-polarized range rate, and then on the second-polarized range and second-polarized range rate.

\* \* \* \* \*